United States Patent [19]
Verheijen et al.

[11] Patent Number: 5,254,288
[45] Date of Patent: Oct. 19, 1993

[54] PROCESS FOR THE PRODUCTION OF POLYESTER WITH INCREASED ELECTROCONDUCTIVITY

[75] Inventors: Johannes M. Verheijen, Ranst; August M. Mariën, Westerlo; Roger I. De Saedeleer, Edegem; Ludovicus M. Hellemans, Boechout; Jan H. Van Hove, Berchem, all of Belgium

[73] Assignee: Agfa-Gevaert, N.V., Morstel, Belgium

[21] Appl. No.: 837,912

[22] Filed: Feb. 20, 1992

[30] Foreign Application Priority Data

Feb. 28, 1991 [EP] European Pat. Off. ........ 91200424.9

[51] Int. Cl.$^5$ .................... H01B 1/00; H01B 1/20; H01B 1/22; C08G 63/692
[52] U.S. Cl. .................... 252/518; 252/500; 528/308; 528/308.6; 528/308.7; 528/308.8; 528/272; 528/275; 528/280
[58] Field of Search .......... 528/308, 308.6, 308.7, 528/308.8, 272, 275, 280; 252/500, 518

[56] References Cited
U.S. PATENT DOCUMENTS 4,110,316 8/1978 Edging et al. .................... 526/68
5,185,426 2/1993 Verheijen et al. ................ 528/272

FOREIGN PATENT DOCUMENTS

105522 4/1984 European Pat. Off. .
70269 6/1976 Japan .
157799 3/1984 Japan .

*Primary Examiner*—Paul Lieberman
*Assistant Examiner*—M. Tierney
*Attorney, Agent, or Firm*—Breiner & Breiner

[57] ABSTRACT

A continuous direct esterification and polycondensation process is disclosed in view of the production of polyester comprising units of ethylene terephthalate as the major repeating units, said polyester being substantially improved in particular in respect of its electroconductive properties. Said process comprises supplying terephtalic acid and ethylene glycol to bis(betahydroxy ethyl) terephthalate or its oligomer so as to carry out esterification, followed by polycondensing the resulting oligomer under increasingly reduced pressure, and wherein a solution in ethylene glycol of an electroconductivity enhancing additive, preferably a metallic salt, such as e.g. magnesium acetate, is added to the oligomer reaction mixture when the esterification rate has reached at least 80% and characterized in that said ethylene glycol solution is added to the oligomer reaction mixture in such manner that escape of the added ethylene glycol out of the said oligomer reaction mixture is prohibited.

9 Claims, 3 Drawing Sheets

PROCESS FOR THE PRODUCTION OF POLYESTER WITH INCREASED ELECTROCONDUCTIVITY

DESCRIPTION

1. Field of the Invention

The present invention relates to a process for the production of polyester. More in particular, the present invention relates to a continuous so-called direct esterification and polymerisation process for the production of a polyester comprising units of ethylene terephthalate as the major repeating units, said polyester being substantially improved in particular in respect of its electroconductive properties in view of its electrostatic adherence to moving quenching members during melt-extrusion.

2. Background of the Invention

Saturated linear polyesters such as polyethylene terephthalate (hereinafter referred to as PETP) are, owing to their excellent physico-chemical properties such as mechanical strength, heat and chemical resistance, transparancy etc., nowadays used for various applications such as packaging materials, electric insulating materials, fibres and filaments as well as support material for magnetic tapes and photographic films.

In view of their widespread use, the processes for manufacturing PETP-granulate and converting said PETP-granulate to film are well known to those skilled in the art.

PETP-film materials are generally obtained by melt-extrusion of the polyester through an extruder, rapidly cooling the melt-extruded sheet on the surface of a cooling drum and then biaxially orienting the solidified material in longitudinal and transverse direction.

The polyester which is melt extruded can be prepared according to two main methods.

In a first method there is an ester exchange reaction between dimethyl terephthalate (DMT) and ethylene glycol (EG) to form bis($\beta$-hydroxyethyl-terephthalate (BHET) whereupon polycondensation takes place. Both in the ester exchange reaction and in the polycondensation reaction catalysts are used: e.g. a zinc, magnesium, manganese, or cobalt salt or mixtures thereof in particular manganese acetate as ester exchange catalyst, and antimony compounds and/or germanium compounds (such as antimony and/or germanium dioxide) as polycondensation catalyst, and stabilisers such as e.g. phosphorus compounds.

In a second method (the so-called direct esterification method) the BHET is obtained by direct esterification of terephthalic acid (PTA) with ethylene glycol (EG). Antimony trioxide and/or germanium dioxide are also added as polycondensation catalyst and a phosphorus compound may be added as stabilizer.

The above processes may further be executed in either a batch or a continuous reactor system. Particulars about the direct esterification method are described in e.g. EU-A-0105 522 and EU-A-0159 817. Particulars about the first PETP production method (the ester exchange reaction method) may be found e.g. in GB-A-1 221 788, GB-A-1 274 858, GB-A-1 108 096, GB-A-1 185 984 and GB-A-1 091 234.

Particulars about the film-forming process of PETP starting from PETP-granulate may be found in GB-A-1 269 127, GB-1-1 312 263 and EU-A-0 022 278.

One of the most critical factors in the above described PETP-film production process is the extrusion of the PETP-film through the extrusion die onto the moving cooling or quenching surface, constituted by a cooled drum or belt. In this stage the PETP-film should be sufficiently cooled to solidify it, and said cooling should take place sufficiently fast so as to become a substantially amorphous film. A solidified film with too high a degree of crystallinity causes problems e.g. rupture, during the subsequent longitudinal and transverse stretching stages. Further a crystallized film looses its transparent character which is of prime importance when the PETP-film is used as support for photographic films.

In order to obtain a rapid quenching of the extruded PETP-film, it is important that the heat transfer from the film to the quenching surface be high. Good heat transfer may be obtained when the film is securely adhered to the quenching surface. Therefore two methods are available: either depositing electrostatic charges to the upper surface of the molten film from a corona-discharge station, prior to the point where the film first contacts with its lower surface the quenching surface which is electrically grounded. This method is described in detail e.g. in U.S. Pat. No. 3,709,964.

According to an alternate method, an electrical potential difference between the quenching member and the extrusion die is maintained, the magnitude of such potential difference being sufficient to improve the adherence of said film to said quenching member. This method is described in U.S. Pat. No. 4,310,294.

Knowing that the electrostatic adherence (i.e. the intimate contact owing to static electricity) of a polyester sheet is enhanced with the increase of the electric charge at the surface of the sheet during extrusion-casting, numerous efforts have been performed to increase the electric charge at the surface of a polyester film sheet by modifying the polyester used for the preparation of the sheet or film. In particular, numerous efforts have been performed so as to lower the specific resistance of the polyester, or formulated in a different way, so as to increase the electroconductivity of the polyester.

Said efforts have been particularly intense owing to the fact that the production capacity of a PETP-film extrusion apparatus is limited by the rotation speed of the cooling or quenching body, the latter being controlled by the phenomenon of the electrostatic adherence of the PETP-film to said member. As the deposition of electric charges to the PETP-film by corona discharge or the electrical potential difference between the quenching member and the extrusion die are also limited for various practical reasons, the production capacity of the PETP-film extrusion apparatus is finally limited by the electroconductivity of the PETP-polymer.

Some background art on the electroconductivity of PETP may be found in the following publications:

'Schottky Emission and Conduction in some Organic Insulating Materials' by G. Lengyel, published in the Journal of Applied Physics, Volume 37, Number 2, February 1966, 'The electrical conductivity of poly(ethyleneterephthalate) in the temperature range 180°–290° C.', by F. S. Smith and C. Scott, published in the British Journal of Applied Physics, 1966, vol. 17, and 'The Structural Dependance of the Electrical Conductivity of Polyethylene Terephthalate', published in the Journal of Polymer Science, vol. 62, pages 331-346 (1962).

Now referring to the two methods for preparing PETP described supra, in the first method—the ester exchange reaction method—the appropriate electroconductivity of the resulting PETP-polymer is generally obtained by the presence of the metal salts of the ester exchange catalysts, such as zinc, magnesium, manganese, cobalt or mixtures thereof.

In the second PETP-production method—the direct esterification method—the appropriate electroconductivity is generally not obtained due to the absence of the electroconductive metal salts described above.

In the absence of an ester exchange catalyst, the addition of various electroconductivity enhancing additives as well as stabilizers to the (continuous) direct esterification and polycondensation process has been suggested in the patent literature.

With respect to the selection of the appropriate compounds and the point of addition of the electroconductivity enhancing additives and the stabiliser compounds in the PETP-production process, various alternative solutions have been proposed in the prior art.

According to the larger part of the patents relating to methods for enhancing the electroconductivity of PETP, the electroconductivity enhancing additives should be added during esterification, e.g. when the esterification rate is situated between 20 and 80%, or at the end of the esterification. The stabilizing compound is usually also added at the end of the esterification stage. However, according to Research Disclosure nr. 23720 entitled 'Method of producing polyester', published in Research Disclosure Bulletin No. 237 of January 1984, the stabilizer may already be added at the initial stage of esterification e.g. by addition to the slurry of PTA and EG.

The specifications of the following patents disclose e.g. various solutions and/or improvements for increasing the electroconductivity of a PETP-polymer, in particular a PETP-polymer produced according to the direct esterification method.

EP-A-0 105 522 discloses a process for the production of PETP by supplying terephthalic acid and ethylene glycol to bis(betahydroxyethyl) terephthalate or its oligomer, during which at least one magnesium compound and at least one phosphorus compound are incorporated into the reaction system, wherein the magnesium compound is incorporated when the esterification rate in the step of esterification reaches about 20-80% and the phosphorus compound is incorporated when the esterification reaches not less than about 91% and wherein a particular molar ratio between the magnesium and phosphorus compound should be met.

JP-Kokai 76-70269 discloses the incorporation of alkali metal or alkaline earth metal compounds just after esterification or ester exchange reaction has come to an end and before the intrinsic viscosity exceeds 0.2 in the course of polycondensation. JP-Kokai 80-84322 discloses the incorporation into the PETP-polymer of at least one ethylene glycol-soluble metallic compound selected from magnesium and manganese, and at least one alkali metal compound and at least one phosphorus compound are added at the end of the esterification and further particular molar ratios between these compounds should be met.

JP-P-1 124 537 discloses the incorporation of at least one metallic compound selected of Zn, Mg and Mn and at least one phosphorus compound after the esterification has substantially been completed and also a particular molar ratio between these compounds should be met.

The workability or the efficiency of the improvements claimed in the above cited specifications depend largely on the fact whether the PETP-polymer is produced according to a batch or a continuous process.

Whereas the cited solutions may suffice for producing PETP-polymer with appropriate electroconductivity produced according to the direct esterification and polymerization process in a batch reaction system, the required level of electroconductivity is not attained when a continuous PETP-direct esterification and polycondensation process is used.

Indeed, in spite of the extensive prior art literature on the electroconductivity of PETP-polymer, and the various solutions disclosed therein relating to the selection of specific electroconductivity enhancing additives, their time of addition to the reaction mixture, the selection of particular stabilizing compounds and their time of addition, and various suggestions in respect of the molar ratio between the selected electroconductivity enhancing additives and the selected stabilizing compounds, the electroconductivity of the PETP-polymer, produced according to a continuous direct esterification and polycondensation process still is insufficient for the purposes of melt-extruding said PETP faultlessly to PETP-film at high speed, in particular at speeds exceeding 60 m/min.

The difficulty in producing PETP-polymer characterised by a high electroconductivity according to the continuous direct esterification and polycondensation process is particularly severe as the latter process becomes nowadays the state-of-the-art process for the production of PETP-polymer.

OBJECT OF THE INVENTION

It is therefore an object of the present invention to provide a continuous direct esterification and polycondensation process for the production of PETP-polymer whereby the resulting PETP-polymer has an appropriate degree of electroconductivity such that it may faultlessly be casted through an extrusion die on a quenching member at high production speed, and further processed to transparent support for photographic film.

It is a further object of the present invention to provide a PETP-polymer production process whereby the resulting PETP-polymer has an enhanced electroconductivity, measured in accordance with the method described hereafter as compared to conventionally produced PETP-polymer.

Further objects and advantages will become apparent from the description hereinafter.

SUMMARY OF THE INVENTION

In accordance with the present invention we now have found, surprisingly, that the above objects may be accomplished by providing a continuous direct esterification and polycondensation process for the production of polyester comprising units of ethylene terephthalate as the major repeating units by supplying terephthalic acid and ethylene glycol to bis(betahydroxyethyl) terephthalate or its oligomer so as to carry out esterification followed by polycondensing the resulting oligomer under increasingly reduced pressure, and wherein a solution in ethylene glycol of an electroconductivity enhancing additive, preferably a metallic salt, the metal still more preferably being selected from the alkali metals, alkaline earth metals or the group consisting of Co, Mn, Cu and Cr, is added to the oligomer reaction mixture when the esterification rate has reached at least 80% characterised in that said ethylene glycol solution is added to said oligomer reaction mixture in such manner that the escape of the added ethylene glycol out of the said oligomer reaction mixture is prohibited.

According to a preferred embodiment, said process is further characterised in that the prohibition of the escape of the ethylene glycol out of the oligomer reaction mixture is obtained by adding the solution in ethylene glycol of the metallic salt to the oligomer reaction mixture while the latter resides in a closed reaction system.

According to a further preferred embodiment of our invention, the said solution in ethylene glycol of the metallic salt is added to the oligomer reaction mixture while the latter resides in a closed connection part between the esterification stage and the polycondensation stage; according to a still more preferred embodiment the said solution is added to the oligomer reaction mixture while the latter resides in a conduit through which the oligomer reaction mixture is transferred from the esterification stage to the first polycondensation stage.

Further preferred embodiments will become clear from the description hereinafter.

DETAILED DESCRIPTION OF THE INVENTION

Polyester

The polyester may be obtained in accordance with the present invention by condensing one or more dicarboxylic acids, e.g. terephthalic acid, isophthalic, phthalic, 2,5-, and 2,6- and 2,7 naphthalene dicarboxylic acid, succinic acid, sebacic acid, adipic acid, azelaic acid, diphenyl dicarboxylic acid, optionally a monocarboxylic acid, such as pivalic acid, with one or more glycols, e.g. ethylene glycol, 1,2- or 1,3-propanediol, 1,4-butanediol, neopentyl glycol and 1,4-cyclohexanedimethanol. However the polyester should comprise units of ethylene terephthalate as the major repeating units.

Continuous polyester production process

The esterification and the polycondensation steps in the process of this invention may be carried out by per se conventional procedures except incorporation of certain amounts of the electroconductivity enhancing compounds into the reaction system at certain stages. We will refer hereinafter to the use of terephthalic acid and ethylene glycol and to the production of PETP (Polyethylene terephthalate polymer) but it is to be understood that other acids and/or glycols as referred to above may be added as well to produce esters with different ester units, the majority of the units being ethylene terephthalate units.

The continuous direct esterification process uses, for instance, 2 to 4 reaction vessels, whereby terephthalic acid and ethylene glycol are supplied in slurry-form to bis(beta-hydroxyethyl)terephthalate or its oligomer.

The esterification may be carried out under any pressure of preferably not more than about 1 bar above atmospheric pressure. A pressure exceeding about 1 bar will unfavorably increase the by-production of diethylene glycol. The oligomer may be present in any amount in the reaction system but its amount is preferred to be so controlled that the molar amount of the acid component in the oligomer is from about ½ to 1/30.

Terephthalic acid and ethylene glycol are usually introduced into the reaction system as a slurry, because of easy handling and accurate measuring. In the slurry, the molar ratio of ethylene glycol and terephthalic acid is preferred to be from about 1.05 to 1.5, particularly from about 1.10 to 1.30. When the molar ratio is less than about from about 1.10 to 1.30. When the molar ratio is less than about 1.0, handling of the slurry is difficult. When more than about 1.5, the by-production of diethylene glycol is increased. The slurry may be prepared by the use of any conventional mixing apparatus and supplied to the reaction system by the aid of a supply pump.

The esterification is generally carried out at a temperature between 240° C. and 280° C. When the temperature is below 240° C., the reaction period is longer, and the production becomes uneconomical. When the temperature is beyond 280° C., the coloration of the product is increased.

For the esterification, there is no requirement to use any catalyst.

The polycondensation is also conducted continuously, preferably in two or more reactors. A suitable temperature for polycondensation is below 290° C. and preferably from 270° to 280°C. A higher temperature will increase the coloration of the polymer. Polycondensation is carried out under increasingly reduced pressure.

The catalyst for polycondensation is not limitative but preferably chosen from antimony compounds, germanium compounds and titanium compounds.

An installation for the continuous direct esterification of terephthalic acid with ethylene glycol followed by low-pressure polymerization in a continuous polymerizer and in a finisher polymerizer to produce polyester suitable for melt-spinning into yarn for textile uses is fully described in U.S.Pat. No. 4,110,316.

Such installation is also suitable for the production of polyesters according to the present invention which are then melt-extruded to form a thermoplastic support for photographic films, provided the process conditions are as set forth hereinafter, and a suitable catalyst/stabilizer combination is used as described hereinafter.

An alternative, slightly modified process and installation for the production of polyester suitable for use in accordance with our invention and according to the direct esterification and polycondensation method is described in GB-A-1,296,242.

For the production of PETP-polymer according to our invention a suitable process is also the so-called "HITACHI Continuous Polyester Process" as described e.g. in Hitachi Review Vol. 27 (1978) No. 1, pages 13-16 and a preferred plant and apparatus is the "HITACHI Continuous Plant" as described in Hitachi Review Vol. 28 (1979), No. 2, pages 83-88.

Figure 1:
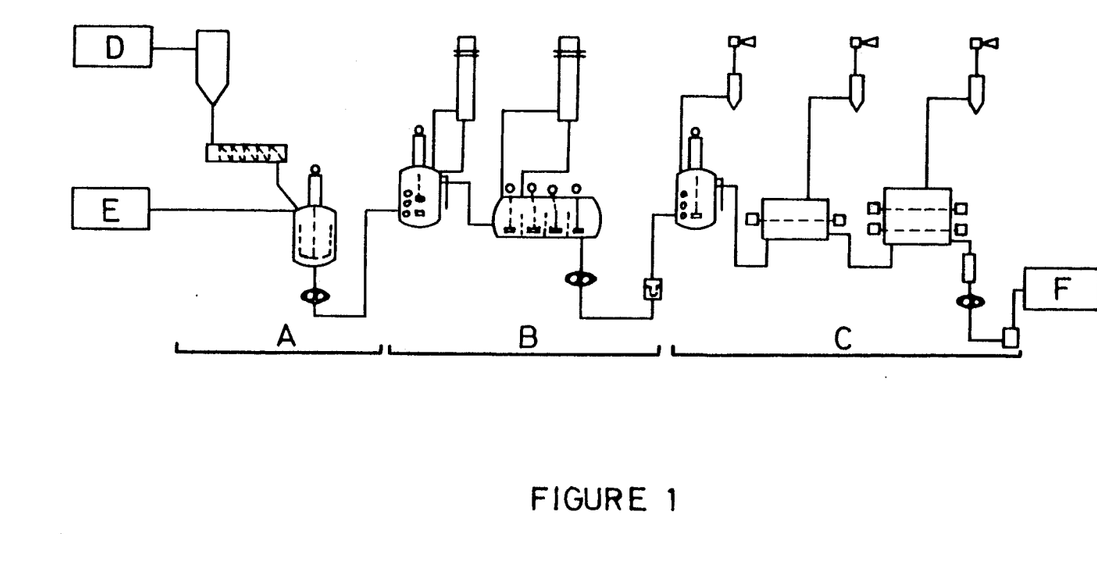
FIG. 1 is a schematic representation of the Hitachi Basic Process Flow.

As is clear from FIG. 1, this continuous process comprises three basic stages:

(A) is the feed stage of the terephthalic acid and ethylene glycol,
(B) is the esterification stage, and
(C) represents the polycondensation stage.

The essential features of these stages are as follows:
(A) Features of feed stage As shown in FIG. 1 pure terephthalic acid (PTA) (represented by D in FIG. 1) and ethylene glycol (EG) (represented by E in FIG. 1) are fed directly into the slurry mixing tank. PTA is fed continuously and constantly by a special powder weighing device. The molar ratio of ethylene glycol unit to terephthalic acid unit is preferably between 1.05 and 1.50.

(B) Features of the esterification stage

The slurry is fed directly into the esterification stage. Two reactors are arranged in series in this stage. Evaporated EG is totally refluxed to each reactor, so the response of EG reflux rate is quick and the conversion of esterification is controlled easily and rigidly. As shown, the second reactor is of the cascade type.

(C) Features of polycondensation (PC) stage

As is shown in FIG. 1 three reactors are used in this stage. The pressure in the reactors is increasingly reduced down streams so the vacuum degree of each reactor is moderate for the degree of polymerization. The second reactor is a special type horizontal single-shaft processor and the finisher is a Hitachi twin-shaft processor with spectacles-shaped blades.

After the slurry mixing tank, the second esterification reactor and the third polymerisation reactor, so-called Finisher reactor, gear pumps are installed; after these reactors, optionally, filtration systems can be foreseen for eliminating impurities.

The polyester melt leaving the finisher polymerization reactor in section F may be either directly fed to a polyester film extrusion line, or quenched and granulated according to conventional means. The granules are then transported e.g. pneumatically to the granules storage silo's of the polyester film production line.

Catalysts, stabilizers, additives

The usual polycondensation catalyst in the PETP-polymer production process of our invention is antimony trioxide and/or germanium dioxide; however any of the known other catalysts used for polycondensation can be applied in the process of our invention.

Usually also a phosphorus compound, acting as stabiliser, is added to the reaction mixture. Preferred examples of the phosphorus compounds, are phosphoric acid, phosphorous acid, mono-, di- or triester of phosphoric acid (e.g. methyl acid phosphate, ethyl acid phosphate, butyl acid phosphate, trimethyl phosphate, triethyl phosphate, triphenyl phosphate), phosphonic acid, phosphonates (e.g. phenyl phosphonate, dimethyl phenyl phosphonate, dimethyl methyl phosphonate, dimethyl benzyl phosphonate, dipethynyl methyl phosphonate, diphenyl phenyl phosphonate). Particularly suitable compounds are also IRGANOX 1222, being the diethylester derivative of 3,5-ditert.butyl-4-hydroxy benzyl-phosphonic acid, available from Ciba-Geigy AG, 4002 Basel, Switzerland and WESTON 600, being a di-isodecyl-pentaerythritoldiphosphite available from Borg-Warner Chemicals Inc., International Center Dept. 5, Parkersburg, WV 26102, USA. These stabiliser compounds are usually added from solutions in ethylene glycol.

The usual additives for enhancing the electroconductivity of the PETP produced can be used in accordance with the present invention and include metallic compounds such as aklali metals, alkaline earth metal, or a metal selected from chromium, cupper, manganese or cobalt salts or mixtures thereof.

These metal compounds can be used for enhancing according to the present invention the electroconductivity of the PETP in the form of oxides, carboxylates such as acetates, benzoates, carbonates, glycolates, oxalates etc. of said metal. Specifically, there are given for example magnesium acetate, calcium carbonate, calcium acetate, lithium acetate, strontium acetate, barium acetate, strontium benzoate, barium benzoate, sodium phthalate, calcium phthalate, calcium terephthalate, barium terephthalate and the like. These compounds are usually added from solutions in an aliphatic diol, most preferably from a solution in ethylene glycol. A method for measuring the electroconductivity of polyester granules is described hereinafter in detail in the examples.

Method and time of addition of catalysts, stabilizers and additives

Apart from the selection of the appropriate catalyst-/additives/stabilizer combination, the time and method of addition of the selected compounds in the reaction mixture is also important.

With respect to the addition of the polycondensation catalyst, it suffices to add these compounds in due time to the reaction mixture before the polycondensation takes place i.e. it may be added right from the start or during esterification. Generally these compounds are added at the end of the esterification, e.g. in the second esterification reactor of the Hitachi Continuous Process.

The stabilizer compound may conventionally be added also in the cause of the esterification reaction, or as suggested in the abovementioned Research Disclosure, at the beginning of the PETP-production process, i.e. during slurry preparation. The latter time of addition is preferred in the execution of the present invention.

Now with respect to the method and time of addition of the electroconductivity enhancing additive, it has been found, as set forth supra, that the electroconductivity of PETP produced according to a continuous direct esterification and polycondensation process may be significantly enhanced if a solution in ethylene glycol of an electroconductivity enhancing metallic salt known per se is added to the oligomer reaction mixture when the esterification has been substantially completed, i.e. at the end of the esterification reaction when the esterification rate has reached at least 80% and preferably at least 96% in such manner that the escape of the added ethylene glycol out of the said oligomer mixture is prohibited.

Conventionally the solution of the metallic salt in ethylene glycol, is added near the end of the last esterification reactor. In case of the continuous Hitachi PETP-production process such solution is conventionally added in the last section of the cascade-type second esterification reactor.

When adding said solution in said way a major portion of ethylene glycol present in the ethylene glycol solution of the metallic salt escapes by evaporation before being intimately mixed with the formed oligomer in said reactor.

When, as set forth above, the solution in ethylene glycol of the selected metallic salt is added in such manner that the escape of the added ethylene glycol out of the said oligomer reaction mixture is prohibited, the electroconductivity of the resulting polyester is surprisingly and unexpectedly significantly enhanced.

Such enhance of the electronductivity may particularly be obtained when adding the solution of the metallic salt in ethylene glycol to the oligomer reaction mixture at a point in the process where said oligomer reaction mixture is present in a closed reaction system.

In the continuous direct esterification and polycondensation reaction process of our invention, escape of the added ethylene glycol can be prohibited according to a further preferred embodiment, by the addition of the metallic salt solution to the oligomer reaction mixture while the latter resides in a closed connection system, more in particular when the oligomer reaction mixture resides in a conduit conveying said mixture from the esterification stage to the polycondensation stage.

In the continuous Hitachi polyester production process as described supra, such conduit is formed by the piping system between the second esterification reactor and the first polycondensation reactor. The amount of metallic salt added is preferably comprised between $1 \times 10^{-4}$ and $1 \times 10^{-3}$ mole of metallic salt per polyester, more preferably between $3 \times 10^{-4}$ and $6 \times 10^{-4}$ mole of metallic salt per mole of polyester.

The invention will now be illustrated hereinafter by means of examples.

COMPARATIVE EXAMPLE 1

Polyethylene terephthalate was produced according to the direct esterification and polycondensation reaction process, more in particular according to the continuous Hitachi process and apparatus as outlined above, starting from pure terephthalic acid and ethylene glycol as raw materials. The PETP-polymer leaving the finisher reactor was quenched and cut to granules according to common means.

The production capacity amounted to 104 tons per day and the process conditions in the various reactors (see FIG. 1) were as follows:

| reactor | Temperature | Pressure |
|---|---|---|
| Esterification section: | | |
| first reactor | 268° C. | 1,7 bar |
| second reactor | 268° C. | atmospheric |
| Polycondensation section: | | |
| first reactor | 270° C. | 27 mbar |
| second reactor | 272° C. | 5 mbar |
| third reactor | 275° C. | 1,5 mbar |

After the first esterification reactor, the esterification rate amounted to approx. 85%, after the second esterification reactor the esterification rate amounted to 96–97%, and the inherent viscosity of the PETP produced, as measured in a phenol/dichloorbenzene mixture, amounted to 0.57 dl/g.

As polycondensation catalysts, a mixture of $GeO_2/Sb_2O_3$ was used in a concentration of $0.3 \times 10^{-4}$ mol $GeO_2$/mol PETP, resp. $1.4 \cdot 10^{-4}$ mol $Sb_2O_3$/mol PETP. Said catalyst mixture was added as a solution of $GeO_2/Sb_2O_3$ in ethylene glycol, said solution being added at a rate of 50.3 kg/h in the last section of the second esterification reactor.

As stabilizer compound the following combination was used: a solution in ethylene glycol of IRGANOX 1222, and WESTON 600, both described above, was added at a rate of 72.5 kg/h such that the concentration of both compounds in the resulting PETP amounted to $2.0 \times 10^{-4}$ mol of IRGANOX 1222/mol PETP and to $0.8 \times 10^{-4}$ mol of WESTON 600/mol PETP. Said solution was added at room temperature to the slurry vessel.

Further as electroconductivity enhancing additive a solution of $Mg(OAc)_2.4 H_2O$ available from Riedel de Haen AG, Wunstorfer Strasse 40, D-3016 Seelse 1, Germany, in ethylene glycol was added, said solution being prepared as follows: to 4.784 l of ethylene glycol were added 78.1 kg of $Mg(OAc)_2.4 H_2O$, said reaction mixture was subsequently stirred at room temperature till a complete solution was obtained. A constant feed rate of 116.9 kg/h of said solution was then continuously fed by a dosing pump into the last section of the second esterification reactor, such that the concentration of magnesium acetate in the resulting PETP amounted to $3.5 \times 10^{-4}$ mol of $Mg(OAc)_2$/mol PETP.

Figure 2:
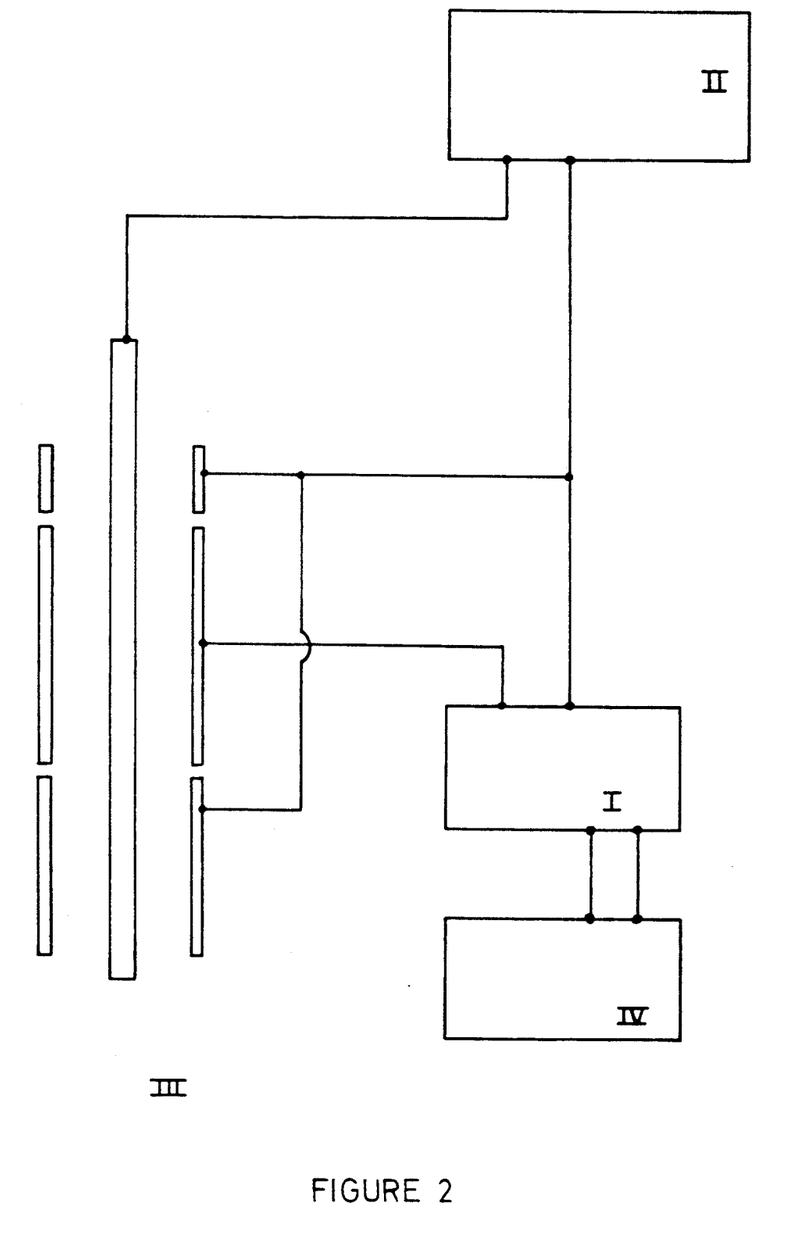
FIG. 2 is a diagrammatical scheme of an arrangement for measuring the elecroconductivity of polyestergranulate as is described under the examples hereinafter.

The procedure for measuring the electroconductivity of the PETP produced was a follows:

FIG. 2 is a diagrammatical scheme of the arrangement for measuring the electroconductivity of PETP-granulate including a microampere meter (I), a DC source or megohm meter (II), the test tube comprising an electrode system (III) and a recorder (IV).

Figure 3:
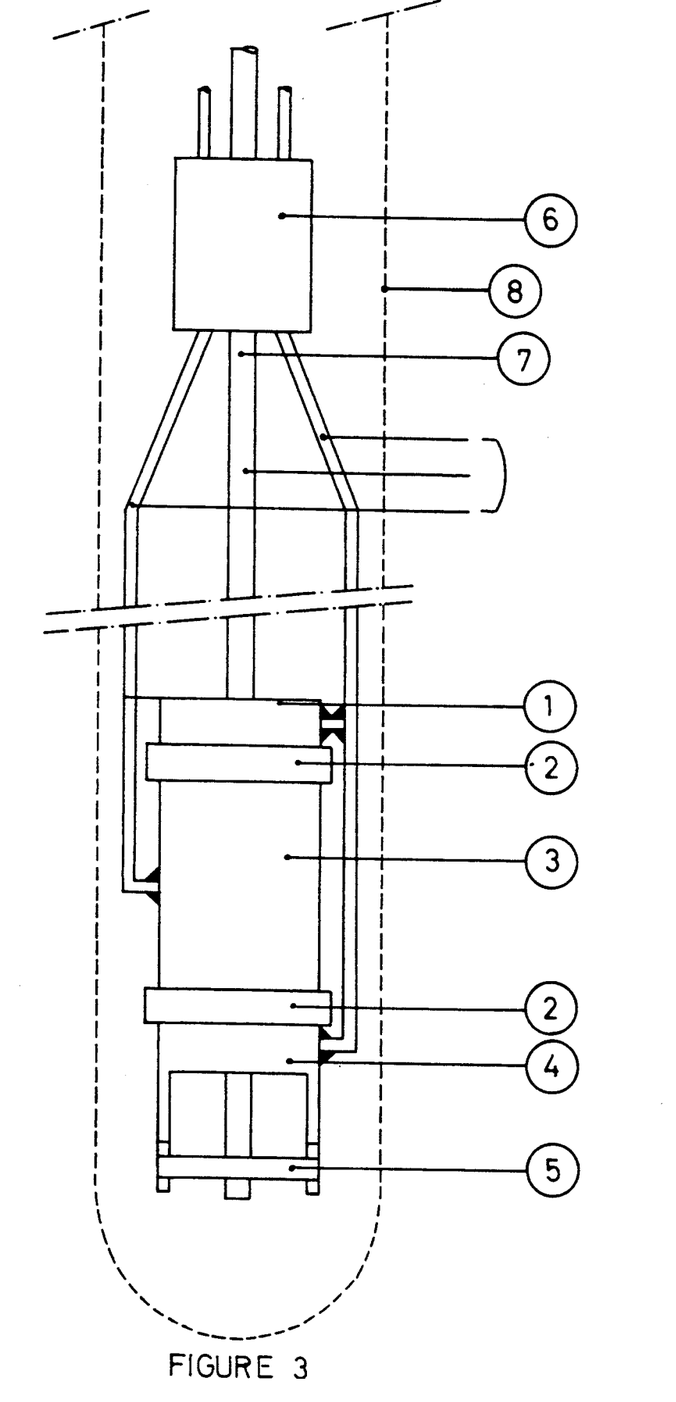
FIG. 3 is a schematic cross-sectional representation of a measurement cell for measuring the electroconductivity of polyester granulate, as described under the examples hereinafter.

FIG. 3 is a schematic cross-sectional representation of the measurement cell comprising the electrode system III for measuring the conductivity of PETP.

In said figure
(1) represents a stainless steel guard ring
(2) represents a isolating ring (made of Teflon)
(3) represents the outer electrode
(4) represents a stainless steel ring
(5) represents a Teflon isolation part for centering the inner electrode
(6) represents a Teflon isolating part.
(7) represents the central electrode.
(8) represents a glass container.

The actual procedure was then as follows.

The dry electrode was placed in the glass container of the measurement cell, which was rinsed with nitrogen; the nitrogen flow was brought at 0.6 l per min. The electric connections were made.

The electrode system (without the PETP sample) was checked by switching on the tension (85 V). The current was smaller than 0.1 uA. A PETP sample of about 20 g was dried under reduced pressure at 150° C. for at least 5 hours.

The glass container of the measurement cell was then filled with the dried sample of 20 g of PETP granulate. The measurement cell was heated so that the PETP granulate in the cell was molten after some 15 min.

A waiting time of 20 min was observed in order to achieve a uniform temperature of 298° C. in the polymer melt of the measurement cell.

The tension (85 V) was than switched on.

The current was then read on the recorder 1 s after the tension was switched on.

The electric conductivity was calculated as follows:

$$\text{conductivity } (S/cm) = \frac{\text{current density } (A/cm^2)}{\text{voltage drop } (V/cm)}$$

The effective surface area of the electrode amounted to 4.62 cm². The average polymer thickness was 0.5 cm. So, at a DC tension of 85 V the conductivity was calculated as follows:

$$\text{conductivity } (S/cm) = \frac{\text{current } (A) \times 0.5 \text{ cm}}{85 \text{ V} \times 4.62 \text{ cm}^2}$$

The conductivity of the PETP-granulate produced according to the above described procedure and measured in accordance with the above described measurement procedure, amounted to 3.7 nS/cm.

COMPARATIVE EXAMPLE 2

The process for producing PETP-polymer as described under Comparative Example 1 was repeated with the difference however that the amount of the solution of magnesium acetate in ethylene glycol added by the dosing pump in the last section of the second esterification reactor was such that the concentration of $Mg(OAc)_2$ in the final PETP-produced amounted to $5.5 \times 10^{-4}$ mol of $Mg(OAc)_2$/mol PETP. The conductivity of the PETP-granulate so produced and measured in accordance with the procedure described under Comparative Example 1 amounted to 5.1 nS/cm.

The conductivity of the PETP-polymer produced according to this Comparative Example was measured also in accordance with the following procedure: in the PETP-polymer pipeline after the gear pump of the finisher reactor of the Hitachi continuous process an electrode system was inserted with the following characteristics: the surface area of the electrodes amounted to 5 cm$^2$, and they were placed at a distance of 0.5 cm from each other. A DC tension of 100 V was then put over these electrodes. The current flowing over the electrodes through the molten PETP-polymer, at a temperature of 280° C., was then measured and recorded, this value being a measure of the electroconductivity of the PETP produced. The current measured when PETP was produced according to the procedure set forth in this Comparative Example, amounted to 0.69 uA.

COMPARATIVE EXAMPLE 3

The process for producing PETP-polymer as described under Comparative Example 1 was repeated with the difference however that instead of $0.8 \times 10^{-4}$ mol of WESTON 600 (described supra)/mol PETP, $1.6 \times 10^{-4}$ mol of trimethylphosphate, being available from Daihachi Chemical Industry Co., Ltd., 3-54, Chodo, Higashi-Osaka City, Osaka Japan in combination with IRGANOX 1222, was added as a solution in ethylene glycol, acting as stabiliser combination, to the slurry vessel.

The electroconductivity of the PETP-polymer so produced and measured in accordance with the procedure described under Comparative Example 1, amounted to 4.2 nS/cm.

The current through the PETP polymer so produced and measured in accordance with the procedure described under Comparative Example 2 amounted to 0.45 uA.

COMPARATIVE EXAMPLE 4

The process for producing PETP-polymer as described under Comparative Example 1 was repeated with the difference however that instead of $0.8 \times 10^{-4}$ mol of WESTON 600/mol PETP, $1.6 \times 10^{-4}$ mol of diethylphosphite, available from Bayer AG, Leverkusen, F.R. Germany, in combination with IRGANOX 1222, was added as a solution in ethylene glycol, acting as stabiliser combination, to the slurry vessel.

The electroconductivity of the PETP-polymer so produced and measured in accordance with the procedure described under Comparative Example 1, amounted to 4.2 nS/cm.

The current through the PETP polymer so produced and measured in accordance with the procedure described under Comparative Example 2 amounted to 0.46 uA.

EXAMPLE 1

The process for producing PETP-polymer as described under Comparative Example 3 was repeated with the difference however that the solution in ethylene glycol of magnesium acetate was added by a dosing pump to the oligomer reaction mixture at a point in the pipeline between the second esterification reactor and the first polycondensation reactor, shortly after gear pump, installed after the second esterification reactor.

The electroconductivity of the PETP so produced and measured in accordance with the procedure described under Comparative Example 1, amounted to 4.8 nS/cm.

The current through the PETP polymer so produced and measured in accordance with the procedure described under Comparative Example 2 amounted to 0.70 uA.

EXAMPLE 2

The process for producing PETP-polymer as described under Example 1 was repeated with the difference however that instead of trimethyl phosphate, diethyl phosphite was used in the same molar amount and in combination with IRGANOX 1222 described above, as stabilizer combination.

The electroconductivity of the PETP-polymer so produced and measured in accordance with the procedure described under Comparative Example 1 amounted to 6.7 nS/cm.

The current through the PETP polymer so produced and measured in accordance with the procedure described under Comparative Example 2 amounted to 0.68 uA.

EXAMPLE 3

The process for producing PETP-polymer as described under Example 1 was repeated with the difference, however, that the amount of solution in ethylene glycol of magnesium acetate added by the dosing pump was such that the concentration of $Mg(OAc)_2$ in the PETP-polymer produced amounted to $5.5 \times 10^{-4}$ mol $Mg(OAc)_2$/mol PETP. The electroconductivity of the PETP-polymer so produced and measured in accordance with the procedure described under Comparative Example 1 amounted to 11.6 nS/cm.

The current through the PETP polymer so produced and measured in accordance with the procedure described under Comparative Example 2 amounted to 1.2 uA.

EXAMPLE 4

The process for producing PETP-polymer as described under Example 2 was repeated with the difference, however, that the amount of solution in ethylene glycol of magnesium acetate added by the dosing pump was such that the concentration of $Mg(OAc)_2$ in the PETP-polymer produced amounted to $5.5 \times 10^{-4}$ mol Mg(OAc)$_2$/mol PETP. The electroconductivity of the PETP-polymer so produced and measured in accordance with the procedure described under Comparative Example 1 amounted to 8.5 nS/cm.

The current through the PETP polymer so produced and measured in accordance with the procedure described under Comparative Example 2 amounted to 1.2 uA.

EVALUATION

From the examples described above, it is apparent that the addition of the selected electroconductivity enhancing additive in the pipeline between the last esterification reactor and the first polycondensation reactor in the continuous direct esterification and polycondensation process described, enhances the electroconductivity of the PETP produced. Contrary to the conventional way of adding the electroconductivity enhancing additive in the esterification reaction system itself, e.g. in the second esterification reactor of the continuous Hitachi PETP-process, according to the method of our invention such compound is added to the oligomer reaction mixture whilst the latter is present in the closed reaction system (in the process described in the above cited examples such closed reaction system is formed by the connecting pipeline between these two reactors). Phrased differently, our invention resides in the fact of adding the solution in ethylene glycol of the magnesium acetate (or any other metallic salt) to the reaction medium when the esterification rate has reached at least 80% preferably at least 96%, and is characterized in that said ethylene glycol solution is added to said oligomer reaction mixture in such manner that escape of the added ethylene glycol out of the said oligomer reaction mixture is prohibited.

From the examples described above it is clear that the method of our invention significantly, surprisingly and unexpectedly enhances the electroconductivity of the resulting polyester.

We claim:

1. A continuous direct esterification and polycondensation process for the production of polyester comprising units of ethylene terephthalate as the major repeating units by supplying terephthalic acid and ethylene glycol to bis(betahydroxyethyl) terephthalate or its oligomer so as to carry out esterification, followed by polycondensing the resulting oligomer under increasingly reduced pressure, and wherein a solution in ethylene glycol of a metallic salt is added to the oligomer reaction mixture when the esterification rate has reached at least 80% characterized in that said solution is added to said oligomer reaction mixture in such manner that escape of the added ethylene glycol out of the said oligomer reaction mixture is prohibited.

2. A process according to claim 1, wherein the prohibition of the escape of the ethylene glycol out of the oligomer reaction mixture is obtained by adding the solution in ethylene glycol of the metallic salt to the oligomer reaction mixture while the latter resides in a closed reaction system.

3. A process according to claim 1, wherein the solution in ethylene glycol of the metallic salt is added in a conduit through which the oligomer reaction mixture is transferred from the esterification stage to the polycondensation stage.

4. A process according to claim 1, wherein the solution in ethylene glycol of the metallic salt is added to the oligomer reaction mixture when the esterification rate has reached at least 96%.

5. A process according to claim 1, wherein the metallic salt is a metal selected from the alkali metals, alkaline earth metals or the group consisting of Co, Mn, Cu and Cr.

6. A process according to claim 5, wherein the metallic salt is magnesium acetate.

7. A process according to claim 5, wherein said metallic salt is added to the oligomer reaction mixture in an amount between $1 \times 10^{-4}$ and $1 \times 10^{-3}$ mole of metallic salt per mole of polyester.

8. A process according to claim 1, wherein a stabilizing compound is added to the slurry mixture of terephthalate acid and ethylene glycol.

9. A process according to claim 1, wherein the stabilizing compound is a phosphorus compound.

* * * * *